(12) United States Patent
Chen et al.

(10) Patent No.: US 10,579,659 B2
(45) Date of Patent: Mar. 3, 2020

(54) METHOD, APPARATUS, ELECTRONIC EQUIPMENT AND STORAGE MEDIUM FOR PERFORMING SCREENING AND STATISTICAL OPERATION ON DATA

(71) Applicants: ZHUHAI KINGSOFT OFFICE SOFTWARE CO., LTD., Zhuhai, Guangdong (CN); BEIJING KINGSOFT OFFICE SOFTWARE, INC., Beijing (CN); GUANGZHOU KINGSOFT MOBILE TECHNOLOGY CO., LTD., Guangzhou, Guangdong (CN)

(72) Inventors: Bo Chen, Zhuhai (CN); Xialin Pi, Zhuhai (CN); Feichao Lu, Zhuhai (CN)

(73) Assignees: ZHUHAI KINGSOFT OFFICE SOFTWARE CO., LTD., Zhuhai (CN); BEIJING KINGSOFT OFFICE SOFTWARE, INC., Beijing (CN); GUANGZHOU KINGSOFT MOBILE TECHNOLOGY CO., LTD., Guangzhou (CN)

( * ) Notice: Subject to any disclaimer, the term of this patent is extended or adjusted under 35 U.S.C. 154(b) by 266 days.

(21) Appl. No.: 15/835,031

(22) Filed: Dec. 7, 2017

(65) Prior Publication Data
US 2019/0042643 A1    Feb. 7, 2019

(30) Foreign Application Priority Data

Aug. 1, 2017    (CN) .......................... 2017 1 0649820

(51) Int. Cl.
G06F 7/00    (2006.01)
G06F 17/30    (2006.01)
(Continued)

(52) U.S. Cl.
CPC .......... G06F 16/335 (2019.01); G06F 16/338 (2019.01); G06F 16/3346 (2019.01); G06F 16/35 (2019.01); G06F 17/245 (2013.01)

(58) Field of Classification Search
None
See application file for complete search history.

(56) References Cited

U.S. PATENT DOCUMENTS

| 2011/0025842 A1* | 2/2011 | King | G06F 17/211 |
| | | | 348/E7.085 |
| 2015/0169705 A1* | 6/2015 | Korbecki | H04N 21/251 |
| | | | 707/736 |
| 2015/0181295 A1* | 6/2015 | Nishimura | H04N 5/44543 |
| | | | 725/59 |

FOREIGN PATENT DOCUMENTS

| JP | 2014085926 A | 5/2014 |
| KR | 20160135969 A | 11/2016 |
| KR | 20170030529 A | 3/2017 |

* cited by examiner

Primary Examiner — Tuan A Pham
(74) Attorney, Agent, or Firm — Blank Rome LLP

(57) ABSTRACT

The embodiments of the present application provide a method, an apparatus, an electronic equipment and a storage medium for performing screening and statistical operation on data. The method includes: obtaining a data region on which screening and statistical operation is to be performed in a data table; the data region may contain content in multiple rows and multiple fields, and the content may have a plurality of different types; receiving a user's screen instruction for screening a field specified by a user to view in the data region; obtaining all the content contained in the field specified by the user to view in the data region according to the user's screen instruction; classifying and summarizing said all the content to obtain a classification statistic result of various types of content, wherein the statistic result includes the various types of content and (Continued)

values corresponding to the various types of content; displaying the statistic result on the screening panel in a specified way. The method can facilitate users to get statistic result in the simplest way, thus the threshold of data analysis can be lowered, time and labor can be saved and the efficiency of statistics can be improved.

19 Claims, 5 Drawing Sheets

(51) Int. Cl.
*G06F 16/335* (2019.01)
*G06F 17/24* (2006.01)
*G06F 16/35* (2019.01)
*G06F 16/338* (2019.01)
*G06F 16/33* (2019.01)

| EMPLOYEE ID ▷ | NAME ▷ | GENDER ▷ | EDUCATIONAL BACKGROUND ▷ | EMPLOYMENT DATE ▷ | DEPARTMENT ▷ | LEVEL ▷ | PERFORMNACE MERIT ▷ |
|---|---|---|---|---|---|---|---|
| 2017 | DF ZHANG | MALE | BACHELOR | 2013/9/27 | PRODUCT DEPARTMENT | LEVEL 2 | 101 |
| 55 | GE LU | FEMALE | BACHELOR | 2012/8/28 | DEVELOPMENT DEPARTMENT | LEVEL 1 | 69 |
| 894 | LD YE | FEMALE | ASSOCIATE | 2012/12/1 | DEVELOPMENT DEPARTMENT | LEVEL 1 | 94 |
| 1967 | PE WANG | MALE | MASTER | 2013/1/10 | QUALITY DEPARTMENT | LEVEL 1 | 91 |
| 2700 | JE LONG | FEMALE | MASTER | 2014/5/21 | PRODUCT DEPARTMENT | LEVEL 3 | 72 |
| 1286 | MD ZHAO | MALE | BACHELOR | 2014/10/19 | PRODUCT DEPARTMENT | LEVEL 3 | 114 |
| 1184 | LF QIAN | MALE | BACHELOR | 2016/4/8 | DEVELOPMENT DEPARTMENT | LEVEL 2 | 84 |
| 1028 | ZE WANG | FEMALE | BACHELOR | 2016/1/9 | DEVELOPMENT DEPARTMENT | LEVEL 2 | 119 |
| 1194 | KW SUN | MALE | MASTER | 2016/7/2 | DEVELOPMENT DEPARTMENT | LEVEL 1 | 87 |
| 2950 | NE LI | FEMALE | BACHELOR | 2012/8/1 | QUALITY DEPARTMENT | LEVEL 1 | 55 |

FIG. 1

| EMPLOYEE ID ▷ | NAME ▷ | GENDER ▷ | EDUCATIONAL BACKGROUND ▷ | EMPLOYMENT DATE ▷ | DEPARTMENT ▷ | LEVEL ▷ | PERFORMNACE MERIT ▷ |
|---|---|---|---|---|---|---|---|
| 2017 | DF ZHANG | MALE | BACHELOR | 2013/9/27 | PRODUCT DEPARTMENT | LEVEL 2 | 101 |
| 2700 | JE LONG | FEMALE | MASTER | 2014/5/21 | PRODUCT DEPARTMENT | LEVEL 3 | 72 |
| 1286 | MD ZHAO | MALE | BACHELOR | 2014/10/19 | PRODUCT DEPARTMENT | LEVEL 3 | 114 |

3 OF THE 10 RECORDS WERE FILTERED OUT

METHOD, APPARATUS, ELECTRONIC EQUIPMENT AND STORAGE MEDIUM FOR PERFORMING SCREENING AND STATISTICAL OPERATION ON DATA

TECHNICAL FIELD

The present application relates to the technical field of data processing, and in particular to a method, an apparatus, an electronic equipment and a storage medium for performing screening and statistical operation on data.

BACKGROUND

In the technical field of data processing, "screening" is widely used as a basic means.

When using the screening function, in addition to screening data that meet specified conditions so as to view, process and analyze the data, sometimes users also require to learn and statistically compute the overall condition and constituent of the data.

Currently, a technical solution employed by a user to learn and statistically compute the overall condition and constituent of the data is: setting a group of filter conditions to check the number of records that meet the group of filter conditions and obtaining a count; and then changing the filter conditions, checking again and obtaining another count; and repeating in such a way for several times.

For example, as shown in FIG. 1, the data table in the figure is an employee comprehensive information statistical table for a certain company. When an administrator needs to know the number of employees in each department, the method the administrator employs is: summarizing types of the company's departments; performing screening and statistical operation on employees according to the different departments respectively. Specifically, the administrator needs to count the types of the company's departments, and then screen the employee information according to the department types one by one. First, the administrator sets a filter condition as "Department=Product department"; the data table receives the filter condition, statistically computes all the information of the product department of the company in the data table and counts the number of records and obtains a count, as shown in FIG. 2. The administrator then changes the filter condition as "Department=Development department"; the data table receives the filter condition, obtains all the information of the development department of the company in the data table and counts the number of records, thus obtaining another count. Similarly, the administrator changes the filter condition as "Department=Quality department"; the data table receives the filter condition, obtains all the information of the quality department of the company in the data table and counts the number of records, thus obtaining still another count. Obviously, when there are many department types or many filter conditions, such method is time-consuming and inefficient.

SUMMARY OF THE INVENTION

The object of embodiments of the present application is to provide a method, an apparatus, an electronic equipment and a storage medium for performing screening and statistical operation on data to improve the efficiency of data statistics. Specific technical solutions are as follows.

In a first aspect, an embodiment of the present application provides a method for performing screening and statistical operation on data, comprising:

obtaining a data region on which screening and statistical operation is to be performed in a data table, wherein the data region may contain content in multiple rows and multiple fields, and the content may have a plurality of different types;

receiving a user's screen instruction for screening a field specified by a user to view in the data region;

obtaining all the content contained in the field specified by the user to view in the data region according to the user's screen instruction;

classifying and summarizing said all the content to obtain a statistic result of various types of content, wherein the statistic result includes the various types of content and values corresponding to the various types of content;

displaying the statistic result on a screening panel in a specified way.

Optionally, the step of obtaining a data region on which screening and statistical operation is to be performed in the data table comprises:

receiving a user instruction of searching for a target data table, wherein the instruction of searching for a target data table is used for searching for a target data table on which screening and statistical operation is to be performed within a specified range;

searching for the target data table within the specified range according to the user instructions of searching for a target data table;

displaying the data region in the target data table, and using the displayed data region in the target data table as the data region on which screening and statistical operation is to be performed in the data table.

Optionally, prior to the step of receiving a user's screen instruction, the method further comprises: receiving a user's filter condition, the user's filter condition being used for filtering out a data region in the target data table which does not meet the user's filter condition.

Optionally, the step of classifying and summarizing said all the content to obtain a statistic result of various types of content, wherein the statistic result includes the various types of content and values corresponding to the various types of content, specifically comprises:

using all the content contained in the field specified by the user to view in the data region as the screen data set;

obtaining a result data set, wherein the result data set is used for storing comparison content of different types and values corresponding to the comparison content;

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content, when the sum of the values is equal to a total number of pieces of content in the screen data set.

Optionally, the step of selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all the comparison content in the result data set;

when there is no comparison content in the result data set which is the same as the piece of content on which no statistical operation is performed, the judgment result is that there is no comparison content in the result data set which is the same as the piece of content on which no statistical operation is performed;

the step of processing a value corresponding to the comparison content in the result data set according to the judgment result, comprises:

adding the piece of content on which no statistical operation is performed to the result data set to form a piece of added comparison content, and a value corresponding to the piece of added comparison content being 1, when the judgment result is that there is no comparison content in the result data set which is the same as the piece of content on which no statistical operation is performed.

Optionally, the step of selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all the comparison content in the result data set;

if there is comparison content in the result data set which is the same as the piece of content on which no statistical operation is performed, the judgment result is that there is comparison content in the result data set which is the same as the piece of content on which no statistical operation is performed;

the step of processing a value corresponding to the comparison content in the result data set according to the judgment result, comprises:

increasing the value corresponding to the comparison content in the result data set which corresponds to the piece of content on which no statistical operation is performed by 1, when the judgment result is that there is comparison content in the result data set which is the same as the piece of content on which no statistical operation is performed.

Optionally, after the step of calculating a sum of values corresponding to all the comparison content in the result data set according to the processed values, the method further comprises:

when the sum of the values is less than a total number of pieces of content in the screen data set, returning to perform step A, step B and step C; using the comparison content and the values corresponding to the comparison content in the result data set as the classification statistic result of the various types of content until the sum of the values is equal to the total number of pieces of content in the screen data set.

Optionally, the specified way may include a direct display way for displaying directly according to the statistic result and a sort display way for sorting according to sizes of the numerical values in the statistic result.

Optionally, after displaying the statistic result on the screening panel in the specified way, the method further comprises generating a text from the statistic result and exporting the text.

In a second aspect, an embodiment of the present application provides an apparatus for performing screening and statistical operation on data, including:

a data region obtaining module for obtaining a data region on which screening and statistical operation is to be performed in a data table, wherein the data region may contain content in multiple rows and multiple fields, and the content may have a plurality of different types;

a screen instruction receiving module for receiving a user's screen instruction, wherein the user's screen instruction is used for screening a field specified by a user to view in the data region;

a content obtaining module for obtaining all the content contained in the field specified by the user to view in the data region according to the user's screen instruction;

a content classifying module for classifying and summarizing said all the content to obtain a statistic result of various types of content, wherein the statistic result includes the various types of content and values corresponding to the various types of content;

a statistic result displaying module for displaying the statistic result on a screening panel in a specified way.

Optionally, the data region obtaining module includes:

a search instruction receiving module for receiving a user instruction of searching for a target data table, wherein the instruction of searching for a target data table is used for searching for a target data table on which screening and statistical operation is to be performed within a specified range;

a searching module for searching for the target data table within the specified range according to the user instructions of searching for a target data table;

a displaying module for displaying the data region in the target data table, and using the displayed data region in the target data table as the data region on which screening and statistical operation is to be performed in the data table.

Optionally, the apparatus also includes:

a user's filter condition receiving module for receiving a user's filter condition prior to the step of receiving a user's screen instruction, wherein the user's filter condition is used for filtering out a data region in the target data table which does not meet the user's filter condition.

Optionally, the content classifying module includes:

a screen data set obtaining module for obtaining all the content contained in the field specified by the user to view in the data region and using all the content as the screen data set;

a data set obtaining module for obtaining a result data set, wherein the result data set is used for storing comparison content of different types and values corresponding to the comparison content;

a judgment result obtaining module for selecting one piece of content on which no statistical operation is performed from the screen data set each time, judging whether there is comparison content in the result data set which is the same as the piece of content on which no statistical operation is performed, and obtaining a judgment result; a value processing module for processing a value corresponding to the comparison content in the result data set according to the judgment result;

a value summation module for calculating a sum of values corresponding to all the comparison content existing in the result data set according to the processed values;

a first content classifying sub-module for using the comparison content and the values corresponding to the comparison content in the result data set as the statistic result of various types of content, when the sum of the values is equal to a total number of pieces of content in the screen data set.

Optionally, the judgment result obtaining module includes:

a first comparison module for selecting one piece of content on which no statistical operation is performed from the screen data set each time, and comparing the piece of content on which no statistical operation is performed with all the comparison content in the result data set;

a first judgment result obtaining sub-module, when there is no comparison content in the result data set which is the same as the piece of content on which no statistical operation is performed, the judgment result is that there is no comparison content in the result data set which is the same as the piece of content on which no statistical operation is performed.

The value processing module includes:

a second value processing sub-module for adding the piece of content on which no statistical operation is performed to the result data set to form a piece of added comparison content, and a value corresponding to the piece of added comparison content being 1, when the judgment result is that there is no comparison content in the result data set which is the same as the piece of content on which no statistical operation is performed.

Optionally, the judgment result obtaining module includes:

a first comparison module for selecting one piece of content on which no statistical operation is performed from the screen data set each time, and comparing the piece of content on which no statistical operation is performed with all the comparison content in the result data set;

a second judgment result obtaining sub-module, when there is comparison content in the result data set which is the same as the piece of content on which no statistical operation is performed, the judgment result is that there is comparison content in the result data set which is the same as the piece of content on which no statistical operation is performed;

the value processing module includes:

a second value processing sub-module for increasing the value corresponding to the comparison content in the result data set which corresponds to the piece of content on which no statistical operation is performed by 1, when the judgment result is that there is comparison content in the result data set which is the same as the piece of content on which no statistical operation is performed.

Optionally, the content classifying module further includes:

a second content classifying sub-module for returning to perform step A, step B and step C when the sum of the values is less than a total number of pieces of content in the screen data set; and using the comparison content and the values corresponding to the comparison content in the result data set as the classification statistic result of the various types of content until the sum of the values is equal to the total number of pieces of content in the screen data set.

Optionally, the specified way may include a direct display way for directly displaying according to the statistic result and a sort display way for sorting according to sizes of the numerical values in the statistic result.

Optionally, after displaying the statistic result on the screening panel in the specified way, the apparatus further includes:

a text exporting module for generating a text from the statistic result and exporting the text.

In a third aspect, an embodiment of the present application provides an electronic equipment comprising a processor, a communication interface, a memory and a communication bus, wherein the processor, the communication interface, and the memory communicate with each other via the communication bus;

the memory is used for storing a computer program;

the processor is used for implementing the steps of any of the methods of the first aspect according to the embodiments of the present application when executing a program stored on the memory.

In a fourth aspect, an embodiment of the present application provides a computer readable storage medium storing a computer program therein, which implementing the steps of any of the method of the first aspect of the embodiments of the present application when being executed by a processor.

Embodiments of the present application provide a method, an apparatus, an electronic equipment and a storage medium for performing screening and statistical operation on data. Those are used for obtaining a data region on which screening and statistical operation is to be performed in the data table, wherein the data region may contain content in multiple rows and multiple fields, and the content may have a plurality of different types; receiving user screening instructions for screening a field specified by a user to view in the data region; obtaining all the content contained in the field specified by the user to view in the data region according to the user screening instructions; classifying and summarizing said all the content to obtain a statistic result of various types of content, wherein the statistic result includes the various types of content and values corresponding to the various types of content; and displaying the statistic result on the screening panel in a specified way.

By classifying and summarizing the content in a field specified by a user to view and displaying different content and corresponding values, the statistic result of various types of content contained in the different fields can be displayed directly and quickly on the screening panel of the data table. This allows the user to understand the overall of the data and its composition without repetitive operations, thereby the "threshold" of data analysis can be lowered, time and labor can be saved, and the efficiency of data statistics can be improved.

Certainly, any product or method for implementing the present application is not necessarily required to achieve all of the advantages described above.

BRIEF DESCRIPTION OF THE DRAWINGS

In order to explain the technical solutions of embodiments of the present application or of the prior art more clearly, the accompanying figures required to be used in the description of the embodiments or the prior art will be described briefly below. Obviously, the figures described below are just some embodiments of the present application and other figures can be obtained by those with ordinary skills in the art based on those figures without any creative efforts.

FIG. 1 is an employee comprehensive information statistical table for a company in the prior art;

FIG. 2 is a statistical table of all the information for the product department in the prior art;

FIG. 5 is a display form of statistic results displayed on a screening panel according to an embodiment of the present application;

FIG. 6 is another display form of statistic results displayed on the screening panel according to an embodiment of the present application;

DETAILED DESCRIPTION OF THE APPLICATION

The technical solutions in the embodiments of the present application will be described clearly and completely below in conjunction with the accompanying figures of embodiments of the present application. Obviously, the embodiments described are merely some of, not all of the embodiments of the present application. All other embodiments obtained by those with ordinary skills in the art based on the embodiments of the present application without any creative efforts shall fall within the scope of protection of the present application.

In order to understand the overall of the data and its composition, a method of screening one by one is generally used in the prior art. The method may comprise: setting a group of filter conditions and summarizing the number of records that meet the filter conditions; and then changing the filter conditions successively and summarizing again.

However, when there are lots of data to be screened or there are many filter conditions, the method of screening one by one is inefficient, time-consuming and laborious.

Based on the above reasons, in order to solve the problem of complex operations, time-consuming and inefficient data statistics existed in the prior art, the present application provides a method of performing screening and statistical operation on data, which obtains a data region on which screening and statistical operation is to be performed in a data table; classifies and summarizes the content contained in a field specified by a user according to a user's screen instruction, so as to obtain various types of content and values corresponding to the various types of content.

By classifying and summarizing the content of a field specified by a user and displaying different content and corresponding values, the statistic result of various types of content contained in the field can be displayed directly and quickly on the screening panel of the data table. This allows the user to understand the overall of the data and its composition without repetitive operations, thereby the "threshold" of data analysis can be lowered, time and labor can be saved, and the efficiency of data statistics can be improved.

It should be noted that the method for performing screening and statistical operation on data provided by the embodiments of the present application could be applied to electronic equipments which may include: desktop computers, portable computers, intelligent mobile terminals, mobile terminals, servers, etc., and are not limited thereto. Any devices that can implement the embodiments of the present application are within the scope of protection of the present application.

The embodiments of the present application provide a method, an apparatus, an electronic equipment and a storage medium for performing screening and statistical operation on data, which will be described below in detail respectively.

Figure 3:
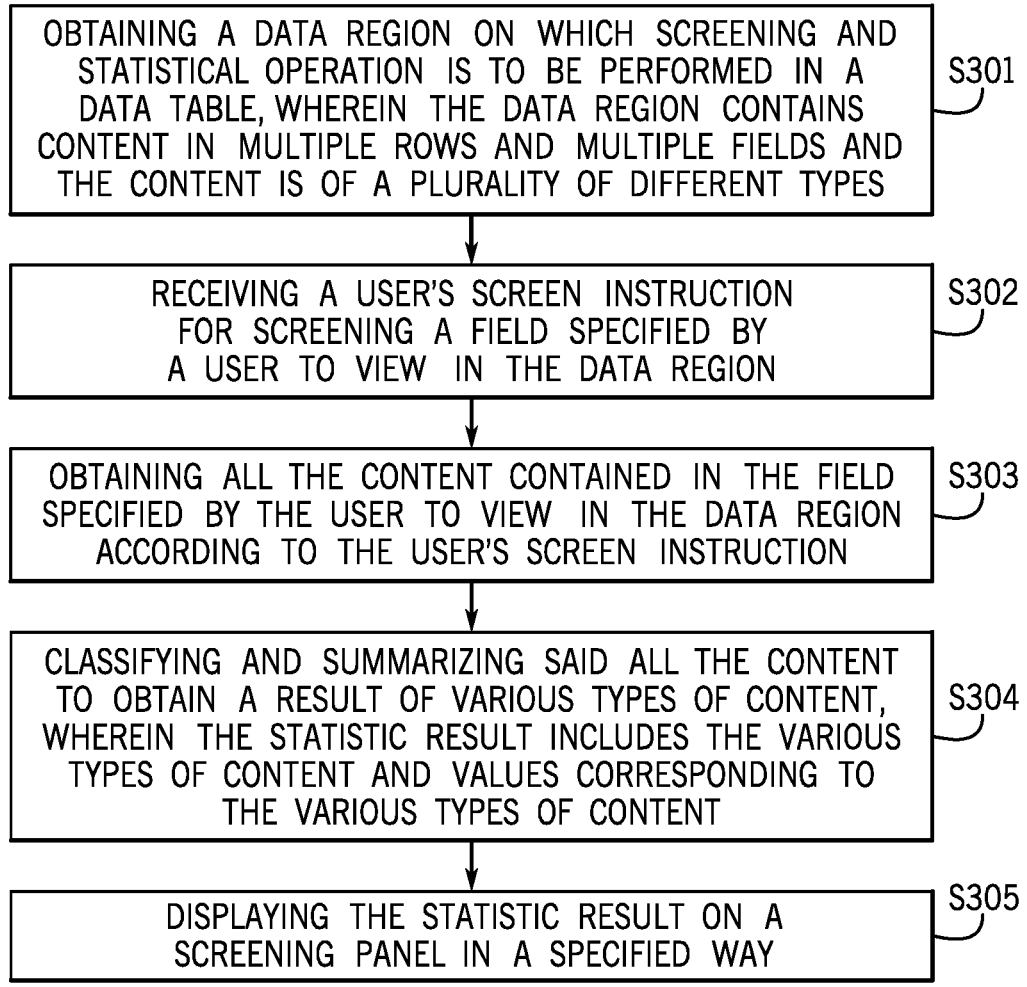
FIG. 3 is a schematic flow chart of a method for performing screening and statistical operation on data according to an embodiment of the present application.

Referring to FIG. 3 which is a schematic flow chart of a method for performing screening and statistical operation on data according to an embodiment of the present application, the method comprises the following steps:

S301, obtaining a data region on which screening and statistical operation is to be performed in a data table, wherein the data region contains content in multiple rows and multiple fields, and the content is of a plurality of different types.

The content contained in the data region may be text of numbers, strings, or symbols, and are not limited thereto. The data region on which screening and statistical operation is to be performed should be obtained first prior to the step of performing screening and statistical operation on the data region in the data table. The obtained data region on which screening and statistical operation is to be performed may contain either multiple rows or only one row, and may contain either multiple fields or one field, wherein the field means a column. For content of each of the fields, there may be either one type or many different types. As shown in FIG. 1, in the field of "Gender", there are two different types of content, namely "Male" and "Female", and in the field of "Department", there are three different types of content, namely "Product department", "Development department" and "Quality department".

Obviously, when there is only 1 row and 1 field or only 1 type of content contained in the data region to be screened, the screening and statistical operations are not necessary to be performed, because the overall of the data and its composition can be obtained directly by the data region itself.

When the number of rows and fields or the number of content types contained in the data region to be screened is one, the follow-up screening and statistical operations will be avoided by limiting the number of rows and fields or the number of content types contained in the data region on which screening and statistical operation is to be performed, which simplifies the operation steps and improves the efficiency of data processing.

S302, receiving a user's screen instruction for screening a field specified by a user to view in the data region.

Since the obtained data region may contain content of multiple fields, a user is required to specify a field to be statistically computed and summarized prior to the step of performing the screening and statistical process. The process of specifying a field by a user is the process of giving a screen instruction, namely, the screen instruction is the instruction that the user specifies a field on which the follow-up screening, statistical and summarizing operations will be performed.

The user can issue screen instructions by selecting the screen drop-down arrow at the specified field identifier. The user can also issue screen instructions by clicking on the right mouse button at the specified field identifier to obtain a selection menu and selecting the "open screening panel" from the selection menu. The aforementioned two ways of issuing screen instructions are simple, convenient, and consistent with the user's conventional operating habits, so that the user operating experience can be improved.

S303, obtaining all the content contained in the field specified by the user to view in the data region according to the user's screen instruction.

S304, classifying and summarizing said all the content to obtain a result of various types of content, wherein the statistic result includes the various types of content and values corresponding to the various types of content;

after obtaining all of the content contained in the field specified by the user to view in the data region, using all of the content as a screen data set; and then obtaining a result data set, wherein the result data set is used for storing comparison content of different types and values corresponding to the comparison content; selecting content in the screen data set successively and comparing it with the comparison content in the result data set; processing the values corresponding to the comparison content in the result data set; obtaining various types of content and values corresponding to the various types of content, which will then be used as the statistic result.

Various types of content and values corresponding to the various types of content can be obtained by classifying and summarizing the content. Therefore, when a user need to understand the overall of the data and its composition, it is not necessary to set the filter conditions one by one to do statistics. Thus, the efficiency of performing screening and statistical operation on data is improved.

S305, displaying the statistic result on a screening panel in a specified way.

Step S305 may optionally include displaying the statistic result on a screening panel in a specified way when at least one of the values corresponding to the various types of content is equal to or greater than 1.

When at least one of the values corresponding to the various types of content is equal to 1, the statistic result is displayed on the screening panel in a specified way.

In the statistic result of the various types of content obtained in S304, the value corresponding to a specific certain type of content may be 1 or may not be 1. When all the values of the various types of content are equal to 1, the user can quickly understand the overall of the data and its composition by using the technical solution of displaying the statistic result on the screening panel.

When at least one of the values of the various types of content is greater than 1, the statistic result is displayed on the screening panel in a specified way.

When at least one of the values of the various types of content is greater than 1, the statistic result is displayed on the screening panel. As the statistic result includes the various types of content and the values corresponding to the various types of content, the user can understand the overall of the data and its composition directly and quickly, thereby the time and labor can be saved and the efficiency of data statistics can be improved.

Optionally, in a particular implementation, obtaining a data region on which screening and statistical operation is to be performed in the data table comprises:

receiving a user instruction of searching for a target data table, wherein the instruction of searching for a target data table is used for searching for a target data table on which screening and statistical operation is to be performed within a specified range;

prior to the step of performing screening and statistical operation on a certain data table stored in a computer, firstly searching in the computer according to the information (for example, the name of the data table or its creation time) related to the data table which is provided by the user. The specific content of the information related to the data table will not be defined herein.

searching for the target data table within the specified range according to the user instructions of searching for a target data table;

the specified range herein may include a computer desktop or other storage disks of the computer;

displaying the data region in the target data table, wherein the displayed data region in the target data table is used as the data region on which screening and statistical operation is to be performed in the data table.

Figure 4:
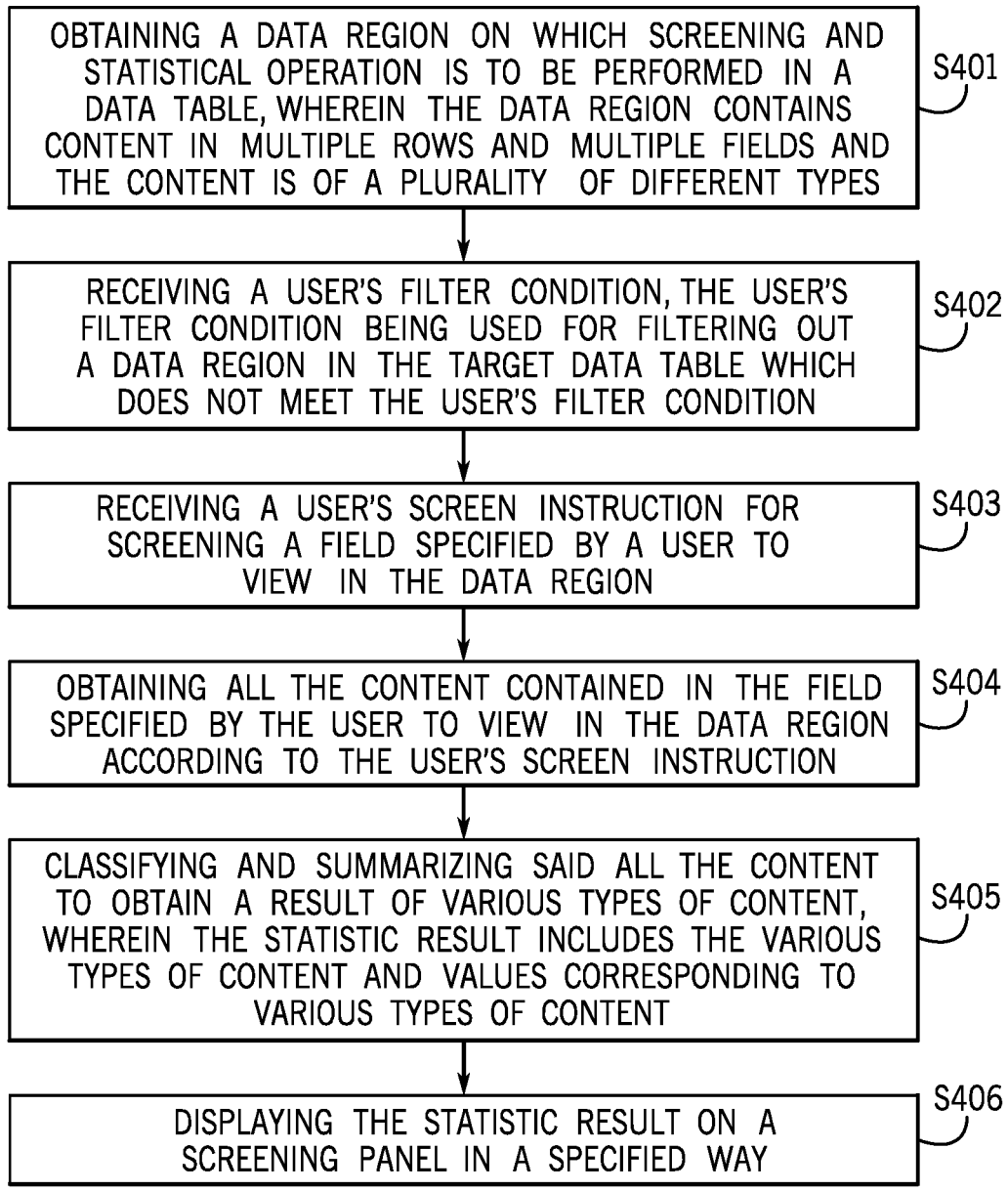
FIG. 4 is another schematic flow chart of the method for performing screening and statistical operation on data according to an embodiment of the present application.

Optionally, in a particular implementation as shown in FIG. 4, the method for performing screening and statistical operation on data comprises:

S401, obtaining a data region on which screening and statistical operation is to be performed in a data table, wherein the data region may contain content in multiple rows and multiple fields, and the content may have a plurality of different types;

S402, receiving a user's filter condition, the user's filter condition being used for filtering out a data region in the target data table which does not meet the user's filter condition.

The user may only need to understand the composition of the data meeting a certain filter condition, thus data regions that do not meet the filter condition can be filtered out according to the user's filter condition after obtaining all the data regions in the target data table. The user's filter condition herein may include time restricted conditions, age restricted conditions or size restricted conditions. Taking the employee information statistical table in FIG. 1 as an example, after obtaining the employee information statistical table, if the user only wants to understand the distribution of the employees of each of the departments whose performance merits are more than 80 scores, the data regions that do not meet the filter condition of "Performance merit>=80" can be filtered out first. Thus when a user wants to know the information of employees of the product department whose performance merits are more than 80 scores, the information of employees of the product department whose performance merits are more than 80 scores can be obtained directly, instead of screening the data again after filtering out all the information of employees of the product department. According to the user's filter condition, the data regions that do not meet the filter condition are filtered out prior to the step of performing screening and statistical operation on the field specified by the user. Thus secondary screening of the data having screened and statistically computed by the user could be avoided, and the efficiency of data processing can be improved.

S403, receiving a user's screen instruction for screening a field specified by a user to view in the data region;

S404, obtaining all the content contained in the field specified by the user to view in the data region according to the user's screen instruction;

S405, classifying and summarizing said all the content to obtain a result of various types of content, wherein the statistic result includes the various types of content and values corresponding to the various types of content;

S406, displaying the statistic result on a screening panel in a specified way.

Above S401 is the same as S301 in FIG. 3, and S403 to S406 are the same as S302 to S305 in FIG. 3. Thus, all of the embodiments in FIG. 4 are applicable to FIG. 3, and can achieve the same or similar advantageous effects, which will not be described again.

After obtaining the data region to be screened, the data that the user does not concern or does not need to learn is filtered out firstly according to the user's filter condition; and then the content contained in the field specified by the user to view are classified and summarized. This allows the user to visually get the overall of the data, which is concerned by the user and meets the user's filter condition, and its distribution without screening the statistic result again. Thus, the operation is simplified, the time and labor are saved and the efficiency of data processing is improved.

Optionally, in a particular implementation, all the content are classified and summarized to obtain a statistic result of the various types of content, wherein the statistic result includes the various types of content and values corresponding to the various types of content, specifically including:

using all the content contained in the field specified by the user to view in the data region as a screen data set;

obtaining a result data set, wherein the result data set is used for storing comparison content of different types and values corresponding to the comparison content;

prior to the step of classifying and summarizing said all the content, an empty data set will be obtained firstly as the result data set for storing the comparison content of different types and values corresponding to the comparison content in the follow-up processes of classifying and summarizing. Initially, the result data set contains zero comparison content and the value corresponding to the comparison content is zero too.

The screen data set described herein refers to all the content contained in the field specified by the user to view and obtained in the data region according to the user's screen instructions after receiving the user's screen instructions.

Various types of content and the values corresponding to the various types of content can be obtained by classifying and summarizing said all the content contained in the field specified by the user to view, which makes it easier for the user to visually understand the composition of the content contained in the specified field and the distribution of various types of content.

Step A, selecting one piece of content on which no statistical operation is performed from the screen data set each time, judging whether there is comparison content in the result data set which is the same as the piece of content on which no statistical operation is performed, and obtaining a judgment result;

The selection of one piece of content on which no statistical operation is performed from the screen data set can be done according to its location in the screen data set. One piece of content on which no statistical operation is performed may be successively selected in the order from top to bottom or in the order from bottom to top to compare with the comparison content.

The successive selection of the piece of content in the screen data set according to the aforementioned orders can effectively avoid the occurrence of content missing and improve the speed of the selection meanwhile, and thereby the judgment result can be obtained quickly.

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content, when the sum of the values is equal to a total number of pieces of content in the screen data set.

By comparing the content in the result data set with those in the screen data set and processing the values corresponding to the content in the result data set, when the sum of the values corresponding to all the comparison content existing in the result data set is equal to the total number of pieces of content in the screen data set, the statistic result of various types of content can be obtained, which saves time and improves the efficiency of data statistics.

Optionally, in a particular implementation, selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all of the comparison content in the result data set;

when there is no comparison content in the result data set which is the same as the piece of content on which no statistical operation is performed, the judgment result is that there is no comparison content present in the result data set which is the same as the piece of content on which no statistical operation is performed.

Processing the values corresponding to the comparison content in the result data set according to the judgment result, comprises:

adding the piece of content on which no statistical operation is performed to the result data set and forming a piece of added comparison content, and the value corresponding to the piece of added comparison content being 1, when the judgment result is that there is no comparison content present in the result data set which is the same as the piece of content on which no statistical operation is performed.

When there is no content in the result data set which is the same as the piece of selected content in the screen data set, it indicates that it is the first time the piece of content of this type is selected from the screen data set. At this moment, a piece of comparison content that is the same as the piece of selected content is necessary to be added into the result data set in order to count the content of this type in the screen data set. The value corresponding to the piece of added comparison content is 1, which means the piece of content selected from the screen data set this time has been recorded in the statistic result.

By adding the comparison content into the result data set, it is possible to avoid the phenomenon of missing any content in the screen data set when there is no content in the result data set which is the same as the piece of content selected in the screen data set, so that the statistic result contains the various types of content in the field specified by the user to view.

Optionally, in a particular implementation, selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all of the comparison content in the result data set;

when there is comparison content in the result data set which is the same as the piece of content on which no statistical operation is performed, the judgment result is that there is comparison content present in the result data set which is the same as the piece of content on which no statistical operation is performed.

Processing the values corresponding to the comparison content in the result data set according to the judgment result, comprises:

increasing the value corresponding to the comparison content which corresponds to the piece of content on which no statistical operation is performed by 1, when the judgment result is that there is comparison content present in the result data set which is the same as the piece of content on which no statistical operation is performed.

When there exists a piece of content in the result data set which is the same as the piece of selected content in the screen data set, it indicates that it is not the first time the piece of content of this type is selected from the screen data set. At this moment, it needs to add 1 to the value corresponding to the comparison content in the result data set which corresponds to the piece of content on which no statistical operation is performed, and indicating that the piece of content selected from the screen data set has been recorded in the statistic result.

The accuracy of the values corresponding to the various types of content in the statistic result can be ensured by increasing the value corresponding to the comparison content in the result data set which corresponds to the piece of content on which no statistical operation is performed by 1.

Optionally, in a particular implementation, after the step of calculating a sum of the values corresponding to all of the comparison content in the result data set according to the processed values, further comprises:

when the sum of the values is less than a total number of pieces of content in the screen data set, returning to perform step A, step B and step C; using the comparison content and the values corresponding to the comparison content in the result data set as the classification statistic result of the various types of content until the sum of the values is equal to the total number of pieces of content in the screen data set.

In order to avoid missing any piece of content in the screen data set during the summarizing process, the sum of the values corresponding to all the comparison content in the result data set should be calculated after processing the values corresponding to the comparison content in the result data. If the sum of the values is less than a total number of pieces of content in the screen data set, it indicates that there are content on which no statistical operation is performed in the screen data set. At this moment, the following steps should be returned to perform until the sum of the values is equal to the number of the content in the screen data set: selecting one piece of content on which no statistical operation is performed; processing the values corresponding to the comparison content in the result data set; and calculating the sum of the values of all the comparison content in the result data set. When the sum of the values is equal to the number of the content in the screen data set, it indicates that all the content in the screen data set have been statistically computed, and all the comparison content in the result data set and the values corresponding to the comparison content are the statistic result of various types of content.

By comparing the sum of the values corresponding to all the comparison content in the result data set with the total number of pieces of content in the screen data set, it is possible to avoid missing any content in the screen data set during the summarizing process. It ensures that all the content in the screen data set are statistically computed and thereby ensures the correctness of the statistic result.

Optionally, in a particular implementation, all the content are classified and summarized to obtain a statistic result of various types of content, wherein the statistic result includes the various types of content and values corresponding to the various types of content, and specifically includes:

using all the content contained in the field specified by the user to view in the data region as the screen data set;

obtaining a result data set, wherein the result data set is used for storing comparison content of different types, values corresponding to the comparison content and block diagrams illustrating the values of the comparison content;

prior to the step of classifying and summarizing said all the content, an empty data set will be obtained firstly as the result data set for storing comparison content of different types, the values corresponding to the comparison content, and the block diagrams illustrating the values of the comparison content in the follow-up processes. Each of the block diagrams contains grids, and the number of the grids is equal to the values corresponding to the comparison various types of content. Initially, there is no comparison content and there is zero grid contained in the block diagram.

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content of different types and the values corresponding to the comparison content and the block diagrams illustrating the values of the comparison content in the result data set as the statistic result of the various types of content, when the sum of the values is equal to the total number of pieces of content in the screen data set.

The various types of content, the values corresponding to the various types of content and the block diagrams illustrating the values of the comparison various types of content can be obtained by classifying and summarizing said all the content contained in the field specified by the user to view. Adding the block diagrams to the result data set makes it easier for the user to visually understand the composition of the content contained in the specified field and the distribution of various types of content.

Optionally, in a particular implementation, selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all the comparison content in the result data set;

when there is no comparison content in the result data set which is the same as the piece of content on which no statistical operation is performed, the judgment result is that there is no comparison content present in the result data set which is the same as the piece of content on which no statistical operation is performed.

The step of processing a value corresponding to the comparison content in the result data set according to the judgment result, comprises:

when the judgment result is that there is no comparison content in the result data set which is the same as the piece of content on which no statistical operation is performed, adding the piece of content on which no statistical operation is performed to the result data set, and forming a piece of added comparison content. The value corresponding to the piece of added comparison content is 1, which means that the block diagram of the value corresponding to the piece of added comparison content contains 1 grid.

By adding the comparison content into the result data set, the phenomenon of missing any content in the screen data set could be avoided when there is no content in the result data set which is the same as the piece of content selected in the screen data set. The statistic result could be ensured that contains the various types of content in the field specified by the user to view.

Optionally, in a particular implementation, selecting one piece of content on which no statistical operation is performed from the screen data set each time, judging whether there is comparison content in the result data set which is the same as the piece of content on which no statistical operation is performed and obtaining a judgment result, comprises:

selecting one piece of content on which no statistical operation is performed from the screen data set each time, and comparing the piece of content on which no statistical operation is performed with all the comparison content in the result data set;

when there is comparison content in the result data set which is the same as the piece of content on which no statistical operation is performed, the judgment result is that there is comparison content present in the result data set which is the same as the piece of content on which no statistical operation is performed.

The step of processing a value corresponding to the comparison content in the result data set according to the judgment result, comprises:

increasing the value corresponding to the comparison content in the result data set which corresponds to the piece of content on which no statistical operation is performed by 1, when the judgment result is that there is comparison content in the result data set which is the same as the piece of content on which no statistical operation is performed; and adding 1 grid to the block diagram which illustrates the value of the comparison content corresponding to the piece of content on which no statistical operation is performed in the result data set.

The accuracy of the values corresponding to the various types of content in the statistic result can be ensured by increasing the value corresponding to the comparison content in the result data set which corresponds to the piece of content on which no statistical operation is performed by 1 and by adding 1 grid to the block diagram which illustrates the value of the comparison content corresponding to the piece of content on which no statistical operation is performed in the result data set. Optionally, in a particular implementation, the specified way may include a way to display the statistic result directly and a way to display the statistic result according to the sequence of numerical values therein.

Figures 5, 6:
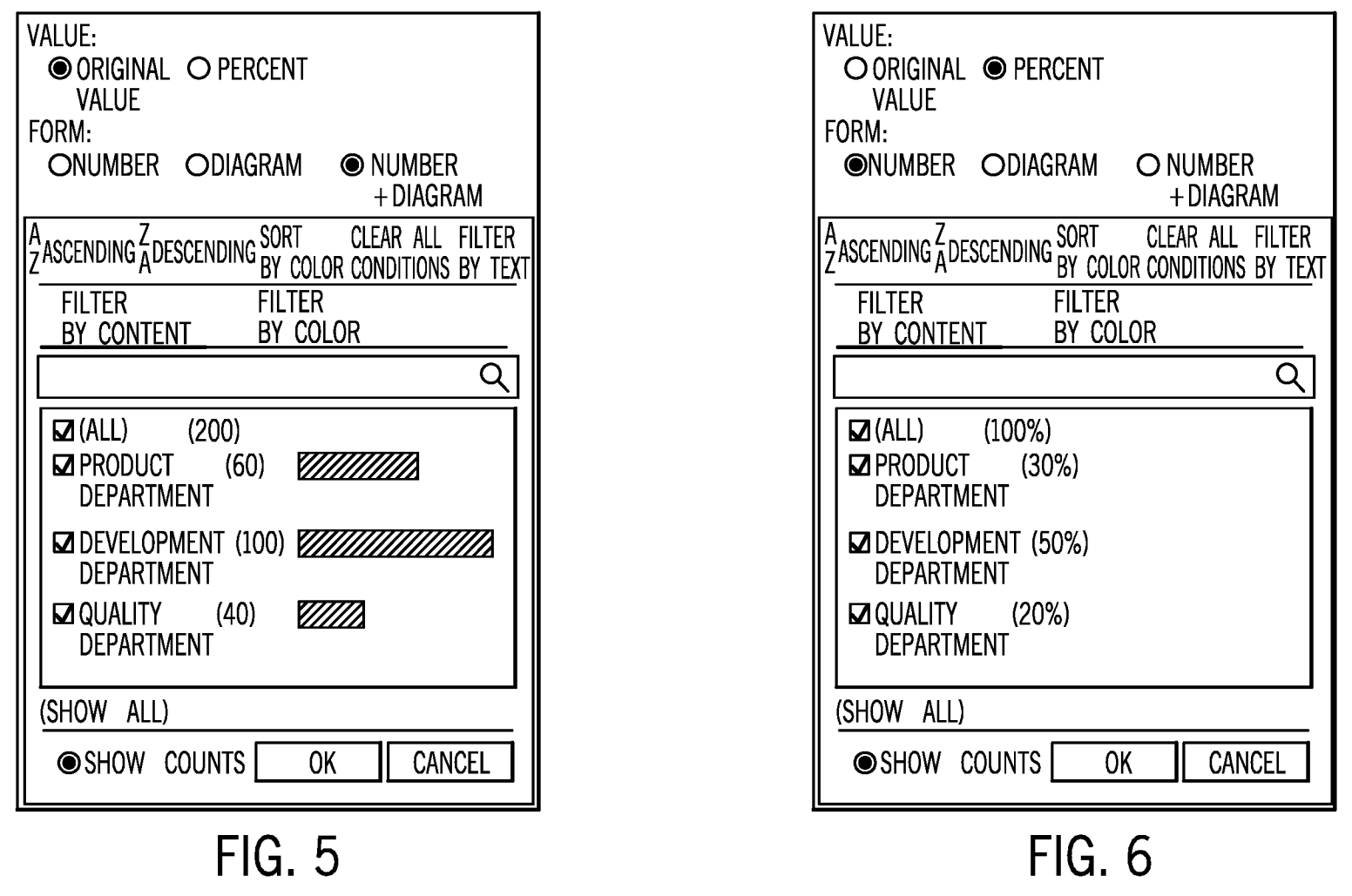

After obtaining the statistic result of various types of content, the selection information of the statistic result display form appears on the screening panel, including numerical values display form and statistic result display form. The numerical values display form may be a form of original values or a form of percentage, wherein the percentage is the ratio of each of the values with the total of the values in the statistics data. The form of the statistic result may display numbers only or may display diagrams only, or may also display the numbers and diagrams at the same time, wherein the diagrams may include bar diagrams, sector diagrams with different angles, or diagrams with different shades of colors, which are not limited herein. The display form of the numerical values and the form of the statistic result are not limited in the embodiments of the present application. When the user chooses to display the statistic result in the form of original values and diagrams, the final result is displayed on the screening panel as shown in FIG. 5. When the user chooses to display the statistic result in the form of percentage, the final result is displayed on the screening panel as shown in FIG. 6.

By sorting the statistic result and directly displaying the number or percentage behind the various types of content, it is convenient for the user to understand the distribution of various types of content in the overall data quickly.

Optionally, in a particular implementation, sorting the statistic result comprises sorting the statistic result according to the size of values corresponding to all the comparison content in the statistic result.

When sorting the statistic result, it can be sorted in an ascending order of the values or in a descending order of the values. Sorting the statistic result according to the size of the values allows the user to find the content type whose quantity is the most or the least in the various types of content quickly.

Optionally, in a particular implementation, after displaying the statistic result on the screening panel in the specified way, it further comprises generating a text from the statistic result and exporting the text.

When generating a text from the statistic result and exporting the text, first, the request information of generating a text from the statistic result and exporting the text is superimposed in the spreadsheet. When the user wants to export the statistic result, the user issues an instruction of generating a text from the statistic result and exporting the text via a preset action, wherein the preset action may include clicking the right mouse button and is not limited herein. After receiving the instruction, the format of the to-be-exported text and the location where the text should be saved are superimposed in the spreadsheet; and generating the text of the statistic result in accordance with the specified format and storing the text in the specified location to be saved. The to-be-exported text format may include a worksheet, a workbook, a HTML page, an image, and an article of We-Media on Microblog or WeChat, etc., which is not limited herein.

After obtaining and displaying statistic result, the user can only see the results on the screening panel and can not view and use the statistic result in other applications or platforms of We-Media. In the embodiments of the present application, by generating the text of the statistic result and exporting the text, the statistic result can be exported into the text of different formats according to the user's demands, which makes it easier for the user to use the statistic result.

Embodiments of the present application may be implemented individually or in combination during a particular implementing process; which can be determined by those skilled in the art according to actual situation and is not limited herein.

Figure 7:
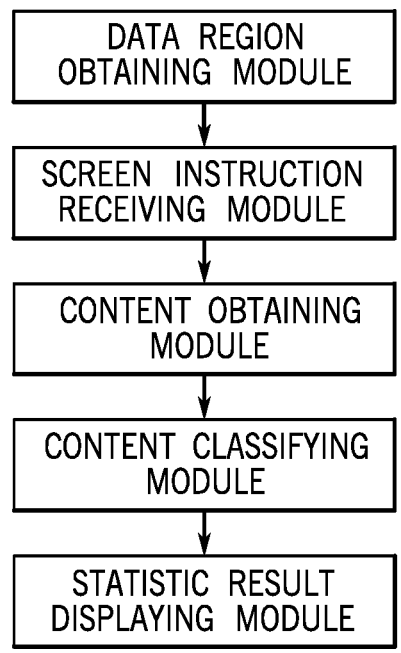
FIG. 7 is a schematic diagram of an apparatus for performing screening and statistical operation on data according to an embodiment of the present application.

The present application also provides an apparatus for performing screening and statistical operation on data, shown in FIG. 7. FIG. 7 is a schematic diagram of the apparatus for performing screening and statistical operation on data of an embodiment of the present application, which comprises:

a data region obtaining module for obtaining a data region on which screening and statistical operation is to be performed in a data table, wherein the data region may contain content in multiple rows and multiple fields, and the content may have a plurality of different types;

a screen instruction receiving module for receiving a user's screen instruction, wherein the user's screen instruction is used for screening a field specified by a user to view in the data region;

a content obtaining module for obtaining all the content contained in the field specified by the user to view in the data region according to the user's screen instruction;

a content classifying module for classifying and summarizing said all the content to obtain a statistic result of various types of content, wherein the statistic result includes the various types of content and values corresponding to the various types of content;

a statistic result displaying module for displaying the statistic result on a screening panel in a specified way.

Optionally, in a particular implementation, the data region obtaining module includes:

a search instruction receiving module for receiving a user instruction of searching for a target data table, wherein the instruction of searching for a target data table is used for searching for a target data table on which screening and statistical operation is to be performed within a specified range;

a searching module for searching for the target data table within the specified range according to the user instructions of searching for a target data table;

a displaying module for displaying the data region in the target data table, wherein the displayed data region in the target data table is the data region on which screening and statistical operation is to be performed in the data table.

Optionally, in a particular implementation, the apparatus for performing screening and statistical operation on data further includes:

a user's filter condition receiving module for receiving a user's filter condition prior to the step of receiving a user's screen instruction, wherein the user's filter condition is used for filtering out a data region in the target data table which does not meet the user's filter condition.

Optionally, in a particular implementation, the content classifying module includes:

a screen data set obtaining module for obtaining all the content contained in the field specified by the user to view in the data region and using all the content as the screen data set;

a data set obtaining module for obtaining a result data set, wherein the result data set is used for storing comparison content of different types and values corresponding to the comparison content; a judgment result obtaining module for selecting one piece of content on which no statistical operation is performed from the screen data set each time, judging whether there is comparison content in the result data set which is the same as the piece of content on which no statistical operation is performed, and obtaining a judgment result; a value processing module for processing a value corresponding to the comparison content in the result data set according to the judgment result;

a value summation module for calculating a sum of values corresponding to all the comparison content existing in the result data set according to the processed values;

a first content classifying sub-module for using the comparison content and the values corresponding to the comparison content in the result data set as the classification statistic result of the various types of content, when the sum of the values is equal to the total number of pieces of content in the screen data set.

Optionally, in a particular implementation, the judgment result obtaining module includes:

a first comparison module for selecting one piece of content on which no statistical operation is performed from the screen data set each time, and comparing the piece of content on which no statistical operation is performed with all the comparison content in the result data set;

a first judgment result obtaining sub-module, when there is no comparison content in the result data set which is the same as the piece of content on which no statistical operation is performed, the judgment result is that there is no comparison content in the result data set which is the same as the piece of content on which no statistical operation is performed.

The value processing module includes:

a second value processing sub-module for adding the piece of content on which no statistical operation is performed to the result data set to form a piece of added comparison content, and a value corresponding to the piece of added comparison content being 1, when the judgment result is that there is no comparison content in the result data set which is the same as the piece of content on which no statistical operation is performed.

Optionally, in a particular implementation, the judgment result obtaining module includes:

a first comparison module for selecting one piece of content on which no statistical operation is performed from the screen data set each time, and comparing the piece of content on which no statistical operation is performed with all the comparison content in the result data set;

a second judgment result obtaining sub-module, when there is comparison content in the result data set which is the same as the piece of content on which no statistical operation is performed, the judgment result is that there is comparison content in the result data set which is the same as the piece of content on which no statistical operation is performed;

Optionally, in a particular implementation, the value processing module includes:

a second value processing sub-module for increasing the value corresponding to the comparison content in the result data set which corresponds to the piece of content on which no statistical operation is performed by 1, when the judgment result is that there is comparison content in the result data set which is the same as the piece of content on which no statistical operation is performed.

The content classifying module further includes:

a second content classifying sub-module for returning to perform step A, step B and step C when the sum of the values is less than the total number of pieces of content in the screen data set; and using the comparison content and the values corresponding to the comparison content in the result data set as the classification statistic result of the various types of content until the sum of the values is equal to the total number of pieces of content in the screen data set.

Optionally, in a particular implementation, after displaying the statistic result on a screening panel in the specified way, the apparatus further includes:

a text exporting module for generating a text from the statistic result and exporting the text.

For embodiments of the apparatus, since they are substantially similar to embodiments of the method, the description thereof is relatively simple; the relating parts could refer to the parts of the description of embodiments of the method. Some or all of the modules can be selected according to actual needs by the embodiments of the present application to achieve the object thereof. The present embodiments may be implemented by those skilled in the art without any creative efforts.

Figure 8:
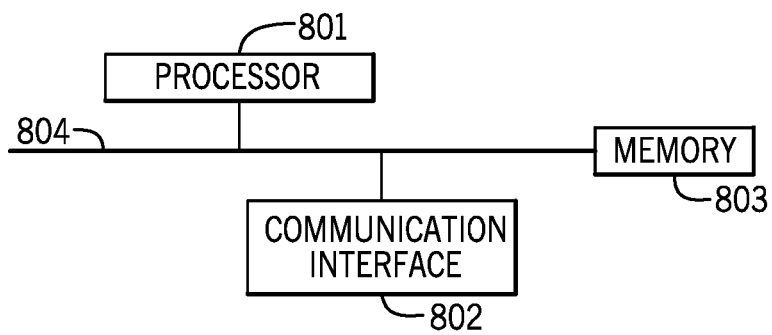
FIG. 8 is a schematic diagram of an electronic equipment according to an embodiment of the present application.

An embodiment of the present application also provides an electronic equipment, as shown in FIG. 8, comprising a processor 801, a communication interface 802, a memory 803 and a communication bus 804, wherein the processor 801, the communication interface 802, and the memory 803 communicate with each other via the communication bus 804, the memory 803 for storing a computer program;

the processor 801 for implementing the following steps when executing a program stored on the memory 803:

obtaining a data region on which screening and statistical operation is to be performed in a data table, wherein the data region may contain content in multiple rows and multiple fields, and the content may have a plurality of different types;

receiving a user's screen instruction for screening a field specified by a user to view in the data region;

obtaining all the content contained in the field specified by the user to view in the data region according to the user's screen instruction;

classifying and summarizing said all the content to obtain a statistic result of various types of content, wherein the statistic result includes the various types of content and values corresponding to the various types of content;

displaying the statistic result on the screening panel in a specified way.

Certainly, the processor 801 can perform any of the above-described methods for performing screening and statistical operation on data while executing a program stored on the memory 803.

The communication bus aforementioned in the above electronic equipment may be a peripheral component interconnect (PCI) bus or an extended industry standard architecture (EISA) bus and the like. The communication bus may include an address bus, a data bus, a control bus, etc. For ease of representation, only one thick line is shown in the figure, which does not mean there is only one bus or one type of bus.

The communication interface is used for communication between the aforementioned electronic equipment and other devices.

The memory may include a random access memory (RAM), or may include a non-volatile memory (NVM) for example at least one disk memory. Optionally, the memory may also be at least one storage device located away from the aforementioned processor.

The aforementioned processor may be a general-purpose processor, including a central processing unit (CPU), a network processor (NP), etc.; and may also be a digital signal processor (DSP), an application specific integrated circuit (ASIC), a field-programmable gate array (FPGA) or other programmable logic devices, a discrete gate or transistor logic device, a discrete hardware component.

In the present embodiment, all the content are classified and summarized to obtain the statistic result of the various types of content, and the statistic result is displayed on the screening panel. A user could understand the overall of the data and its composition quickly, thus the time and labor can be saved, and the efficiency of data statistics can be improved.

An embodiment of the present application also provides a computer readable storage medium storing a computer program therein, which implements the steps of any of the methods for performing screening and statistical operation on data of the embodiments of the present application when being executed by a processor.

In the present embodiment, the program stored in the storage medium is executed, and all the content are classified and summarized to obtain the statistic result of various types of content, and the statistic result is displayed on the screening panel. A user could understand the overall of the data and its composition, thus the time and labor can be saved, and the efficiency of data statistics can be improved.

For embodiments of the electronic equipment or the storage medium, since they are substantially similar to the embodiments of the method, the description thereof is relatively simple; the relating parts could refer to the parts of the description of embodiments of the method.

It should be noted that, the relationship terms herein such as "first", "second" and the like, if any, are only used for distinguishing one entity or operation from another entity or operation, but do not necessarily require or imply that there is any such actual relationship or order between these entities or operations. Moreover, the terms "include", "comprise" or any other variants thereof are intended to cover a non-exclusive inclusion, so that processes, methods, articles, or devices comprising a series of elements comprise not only those elements listed but also other elements not specifically listed or the elements intrinsic to those processes, methods, articles, or devices. Without further limitations, elements defined by the sentences "comprise(s) a/an . . . " or "include(s) a/an . . . " do not exclude that there are other identical elements in the processes, methods, articles, or devices which comprise those elements.

Various embodiments of the present application are described in a correlated manner, and same or similar parts in various embodiments can be referred to one another, the parts emphasized by each embodiment are differences with other embodiments. Especially for embodiments of a system, since they are substantially similar to embodiments of a method, the description thereof is relatively simple; the relating parts could refer to the parts of the description of embodiments of the method.

Embodiments described above are just preferred embodiments of the present application, and are not intended to limit the scope of the present application. Any modifications, equivalent substitutions, improvements or the like within the spirit and principle of the present application are to be included in the scope of protection of the present application.

The invention claimed is:

1. A method for performing screening and statistical operation on data, wherein the method comprises:

obtaining a data region on which screening and statistical operation is to be performed in a data table, the data region containing content in multiple rows and multiple fields, and the content being of a plurality of different types;

receiving a user's screen instruction for screening a field specified by a user to view in the data region;

obtaining all the content contained in the field specified by the user to view in the data region according to the user's screen instruction;

classifying and summarizing the content to obtain a classification statistic result of various types of content, the classification statistic result comprising the various types of content and values corresponding to the various types of content, the classifying and summarizing of the content comprising:

using content contained in the field specified by the user to view in the data region as a screen data set;

obtaining a result data set, wherein the result data set is used for storing comparison content of different types and values corresponding to the comparison content;

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content when the sum of the values is equal to a total number of pieces of content in the screen data set; and displaying the statistic result on a screening panel in a specified way.

2. The method according to claim 1, wherein the step of obtaining a data region on which screening and statistical operation is to be performed in a data table comprises:

receiving a user's instruction of searching for a target data table, wherein the instruction of searching for a target data table is used for searching for a target data table on which screening and statistical operation is to be performed within a specified range;

searching for the target data table within the specified range according to the user's instruction of searching for a target data table; and displaying the data region in the target data table, and using the displayed data region in the target data table as the data region on which screening and statistical operation is to be performed in the data table.

3. The method according claim 1, wherein prior to the step of receiving a user's screen instruction, the method further comprises: receiving a user's filter condition, the user's filter condition being used for filtering out a data region in the target data table which does not meet the user's filter condition.

4. The method according to claim 1, wherein the step of selecting one piece of content on which no statistical operation is performed from the screen data set, judging whether there is comparison content in the result data set which is the same as the piece of content on which no statistical operation is performed and obtaining a judgment result, comprises:

selecting one piece of content on which no statistical operation is performed from the screen data set, and comparing the piece of content on which no statistical operation is performed with all the comparison content in the result data set;

the judgment result being that there is no comparison content in the result data set which is the same as the piece of content on which no statistical operation is performed when there is no comparison content in the result data set which is the same as the piece of content on which no statistical operation is performed;

the step of processing a value corresponding to the comparison content in the result data set according to the judgment result comprising:

adding the piece of content on which no statistical operation is performed to the result data set to form a piece of added comparison content with a corresponding value of 1 when the judgment result is that there is no comparison content in the result data set which is the same as the piece of content on which no statistical operation is performed.

5. The method according to claim 1, wherein the step of selecting one piece of content on which no statistical operation is performed from the screen data set, judging whether there is comparison content in the result data set which is the same as the piece of content on which no statistical operation is performed and obtaining a judgment result, comprises:

selecting one piece of content on which no statistical operation is performed from the screen data set, and comparing the piece of content on which no statistical operation is performed with all the comparison content in the result data set;

the judgment result being that there is comparison content in the result data set which is the same as the piece of content on which no statistical operation is performed when there is comparison content in the result data set which is the same as the piece of content on which no statistical operation is performed;

the step of processing a value corresponding to the comparison content in the result data set according to the judgment result comprising:

increasing a value corresponding to comparison content in the result data set which corresponds to the piece of content on which no statistical operation is performed by 1, when the judgment result is that there is comparison content in the result data set which is the same as the piece of content on which no statistical operation is performed.

6. The method according to claim 1, wherein after the step of calculating a sum of values corresponding to all the comparison content in the result data set according to the processed values, the method further comprises:

when the sum of the values is less than the total number of pieces of content in the screen data set, returning to perform step A, step B and step C until the sum of the values is equal to the total number of pieces of content in the screen data set, and then using the comparison content in the result data set and the values corresponding to the comparison content as the classification statistic result of the various types of content.

7. The method according to claim 1, wherein the specified way comprises a direct display way for directly displaying according to the statistic result and a sort display way for sorting according to the values in the statistic result.

8. The method according to claim 1, wherein after the step of displaying the statistic result on a screening panel in a specified way, the method further comprises: generating a text from the statistic result and exporting the text.

9. A non-transitory computer readable medium for storing a program causing a computer to perform statistical operation on data, wherein the non-transitory computer readable medium comprises:

a data region obtaining module configured and arranged to obtain a data region on which screening and statistical operation is to be performed in a data table, the data region containing content in multiple rows and multiple fields, and the content being of a plurality of different types;

a screen instruction receiving module configured and arranged to receive a user's screen instruction, the screen instruction being configured and arranged to screen a field used for screening a field specified by a user to view in the data region;

a content obtaining module configured and arranged to obtain all the content contained in the field specified by the user to view in the data region according to the user's screen instruction;

a content classifying module configured and arranged to classify and summarize the content to obtain a classification statistic result of various types of content, the classification statistic result comprising the various types of content and values corresponding to the various types of content, the classifying and summarizing of the content comprising:

using content contained in the field specified by the user to view in the data region as a screen data set;

obtaining a result data set, wherein the result data set is used for storing comparison content of different types and values corresponding to the comparison content;

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content when the sum of the values is equal to a total number of pieces of content in the screen data set; and a statistic result displaying module configured and arranged to display the statistic result on a screening panel in a specified way.

10. The non-transitory computer readable medium according to claim 9, wherein the data region obtaining module comprises:

a searching instruction receiving module configured and arranged to receive a user's instruction of searching for a target data table, wherein the instruction of searching for a target data table is used for searching for a target data table on which screening and statistical operation is to be performed within a specified range;

a searching module configured and arranged to search for searching for the target data table within the specified range according to the user's instruction of searching for a target data table;

a displaying module configured and arranged to display for displaying the data region in the target data table and using the displayed data region in the target data table as the data region on which screening and statistical operation is to be performed in the data table.

11. The non-transitory computer readable medium according to claim 9, wherein the apparatus further comprises:

a user's filter condition receiving module configured and arranged to receive for receiving a user's filter condition prior to receiving a user's screen instruction, the user's filter condition being used for filtering out a data region in the target data table which does not meet the user's filter condition.

12. The non-transitory computer readable medium according to claim 9, wherein the content classifying module comprises:

a screen data set obtaining module configured and arranged to use the content contained in the field specified by the user to view in the data region as a screen data set;

a data set obtaining module configured and arranged to obtain a result data set, wherein the result data set is configured and arranged to be used for storing comparison content of different types and values corresponding to the comparison content;

a judgment result obtaining module configured and arranged to select one piece of content on which no statistical operation is performed from the screen data set each time, judging whether there is comparison content in the result data set which is the same as the piece of content on which no statistical operation is performed, and obtaining a judgment result;

a value processing module configured and arranged to process a value corresponding to the comparison content in the result data set according to the judgment result;

a value summation module configured and arranged to calculate a sum of values corresponding to all the comparison content existing in the result data set according to the processed values;

a first content classifying sub-module configured and arranged to use the comparison content and the values corresponding to the comparison content in the result data set as the classification statistic result of the various types of content when the sum of the values is equal to a total number of pieces of content in the screen data set.

13. The non-transitory computer readable medium according to claim 12, wherein the judgment result obtaining module comprises:

a first comparison module configured and arranged to select one piece of content on which no statistical operation is performed from the screen data set and comparing the piece of content on which no statistical operation is performed with all the comparison content in the result data set;

a first judgment result obtaining sub-module, the judgment result being that there is no comparison content in the result data set which is the same as the piece of content on which no statistical operation is performed when there is no comparison content in the result data set which is the same as the piece of content on which no statistical operation is performed;

the value processing module comprising:

a second value processing sub-module configured and arranged to add the piece of content on which no statistical operation is performed to the result data set to form a piece of added comparison content with a corresponding value of 1 when the judgment result is that there is no comparison content in the result data set which is the same as the piece of content on which no statistical operation is performed.

14. The non-transitory computer readable medium according to claim 12, wherein the judgment result obtaining module comprises:

a first comparison module configured and arranged to select one piece of content on which no statistical operation is performed from the screen data set and comparing the piece of content on which no statistical operation is performed with all the comparison content in the result data set;

a second judgment result obtaining sub-module, the judgment result being that there is comparison content in the result data set which is the same as the piece of content on which no statistical operation is performed when there is comparison content in the result data set which is the same as the piece of content on which no statistical operation is performed;

the value processing module comprising:

a second value processing sub-module configured and arranged to increase a value corresponding to comparison content in the result data set which corresponds to the piece of content on which no statistical operation is performed by 1, when the judgment result is that there is comparison content in the result data set which is the same as the piece of content on which no statistical operation is performed.

15. The non-transitory computer readable medium according to claim 9, wherein the content classifying module further comprises:

a second content classifying sub-module configured and arranged to, when the sum of the values is less than the total number of pieces of content in the screen data set, returning to perform step A, step B and step C until the sum of the values is equal to the total number of pieces of content in the screen data set, and then using the comparison content in the result data set and the values corresponding to the comparison content as the classification statistic result of the various types of content.

16. The non-transitory computer readable medium according to claim 9, wherein the specified way comprises a direct display way configured and arranged to display directly displaying according to the statistic result and a sort display way configured and arranged to sort according to the values in the statistic result.

17. The non-transitory computer readable medium according to claim 9, wherein after displaying the statistic result on the screening panel in the specified way, the apparatus further comprises:

a text exporting module configured and arranged to generate a text from the statistic result and exporting the text.

18. An electronic equipment, wherein the electronic equipment comprises a processor, a communication interface, a memory and a communication bus, wherein the processor, the communication interface and the memory communicate with each other via the communication bus;

the memory configured and arranged to store a computer program;

the processor configured and arranged to implement, when executing a program stored on the memory, the steps of:

obtaining a data region on which screening and statistical operation is to be performed in a data table, the data region containing content in multiple rows and multiple fields, and the content being of a plurality of different types;

receiving a user's screen instruction for screening a field specified by a user to view in the data region;

obtaining all the content contained in the field specified by the user to view in the data region according to the user's screen instruction;

classifying and summarizing the content to obtain a classification statistic result of various types of content, the classification statistic result comprising the various types of content and values corresponding to the various types of content, the classifying and summarizing of the content comprising:

using content contained in the field specified by the user to view in the data region as a screen data set; obtaining a result data set, wherein the result data set is used for storing comparison content of different types and values corresponding to the comparison content;

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content when the sum of the values is equal to a total number of pieces of content in the screen data set; and displaying the statistic result on a screening panel in a specified way.

19. A non-transitory computer readable storage medium, wherein the computer readable storage medium stores a computer program therein, the computer program, when being executed by a processor, implementing the steps of:

obtaining a data region on which screening and statistical operation is to be performed in a data table, the data region containing content in multiple rows and multiple fields, and the content being of a plurality of different types;

receiving a user's screen instruction for screening a field specified by a user to view in the data region;

obtaining all the content contained in the field specified by the user to view in the data region according to the user's screen instruction;

classifying and summarizing the content to obtain a classification statistic result of various types of content, the classification statistic result comprising the various types of content and values corresponding to the various types of content, the classifying and summarizing of the content comprising:

using content contained in the field specified by the user to view in the data region as a screen data set; obtaining a result data set, wherein the result data set is used for storing comparison content of different types and values corresponding to the comparison content;

step A, selecting one piece of content on which no statistical operation is performed from the screen data set each time, judging whether there is comparison content in the result data set which is the same as the piece of content on which no statistical operation is performed, and obtaining a judgment result;

step B, processing a value corresponding to the comparison content in the result data set according to the judgment result;

step C, calculating a sum of values corresponding to all the comparison content existing in the result data set according to the processed values;

using the comparison content and the values corresponding to the comparison content in the result data set as the classification statistic result of the various types of content when the sum of the values is equal to a total number of pieces of content in the screen data set; and displaying the statistic result on a screening panel in a specified way.

* * * * *